United States Patent
Ludwig et al.

(10) Patent No.: US 6,962,249 B2
(45) Date of Patent: Nov. 8, 2005

(54) CONVEYING DEVICE

(75) Inventors: Peter Ludwig, Tuebingen (DE); Uwe Lindemann, Holzgerlingen (DE)

(73) Assignee: Bosch Rexroth AG, Stuttgart (DE)

( * ) Notice: Subject to any disclaimer, the term of this patent is extended or adjusted under 35 U.S.C. 154(b) by 40 days.

(21) Appl. No.: 10/610,197

(22) Filed: Jun. 30, 2003

(65) Prior Publication Data
US 2004/0031663 A1 Feb. 19, 2004

(30) Foreign Application Priority Data
Jul. 1, 2002 (DE) .......................................... 102 29 440

(51) Int. Cl.$^7$ ............................................. B65G 15/64
(52) U.S. Cl. ................................. 198/345.3; 198/465.2
(58) Field of Search .......................... 198/345.3, 465.2, 198/867.13, 867.14

(56) References Cited

U.S. PATENT DOCUMENTS

| | | | | |
|---|---|---|---|---|
| 3,581,877 A | * | 6/1971 | Goldberg ................. | 198/836.1 |
| 3,645,375 A | * | 2/1972 | Gelzer ..................... | 198/339.1 |
| 3,805,942 A | * | 4/1974 | Auernhammer ........ | 198/341.03 |
| 4,325,480 A | * | 4/1982 | Butt ........................... | 198/841 |
| 4,475,642 A | * | 10/1984 | Fritz ........................ | 198/345.3 |
| 4,485,911 A | * | 12/1984 | Cameron ................. | 198/345.3 |
| 4,562,921 A | * | 1/1986 | Leemkuil et al. ........... | 198/841 |
| 4,993,541 A | * | 2/1991 | Roh ........................ | 198/781.02 |
| 5,404,992 A | * | 4/1995 | Robu et al. .............. | 198/465.4 |
| 5,718,320 A | * | 2/1998 | Marquier et al. ........ | 198/345.3 |
| 5,735,384 A | | 4/1998 | Lingo et al. | |
| 5,788,056 A | * | 8/1998 | Clopton ..................... | 198/779 |
| 6,058,993 A | * | 5/2000 | Albert et al. ............... | 144/382 |
| 6,122,821 A | * | 9/2000 | Dornieden et al. .......... | 29/791 |
| 6,474,463 B1 | | 11/2002 | Woelfel | |
| 6,644,211 B2 | * | 11/2003 | Baier et al. .............. | 104/172.4 |

FOREIGN PATENT DOCUMENTS

| | | |
|---|---|---|
| DE | 1 192 103 | 12/1965 |
| DE | 32 12 224 A | 10/1983 |
| DE | 32 12 224 A1 | 10/1983 |
| DE | 195 17 276 A | 11/1996 |
| DE | 195 17 276 C2 | 1/1999 |
| DE | 198 25 955 A1 | 12/1999 |
| DE | 198 25 955 A | 12/1999 |
| EP | 0 623 518 A | 11/1994 |
| GB | 601719 | 5/1948 |

* cited by examiner

Primary Examiner—Kathy Matecki
Assistant Examiner—Rashmi Sharma
(74) Attorney, Agent, or Firm—Michael J. Striker

(57) ABSTRACT

A conveying device (10) for transporting transported goods includes at least one profile rail (12), at least one transported goods support (14) that is supported by the at least one profile rail and is moveable along the profile rail, and a drivable conveyor unit (16) extending along at least one profile rail (12), whereby the at least one transported goods support (14) has at least one engagement unit (20), which is in locked-in engagement with the conveyor unit (16) or can be brought into locked-in engagement with the conveyor unit. The engagement unit (20) has an engagement element (24) revolving about a bearing unit (22), and in addition, a coupling assembly that effects the revolving movement of the engagement element (24) is provided.

24 Claims, 4 Drawing Sheets

CONVEYING DEVICE

BACKGROUND OF THE INVENTION

The present invention relates to a conveying device for transporting material goods with at least one profiled rail, with at least one transported goods support that is supported by the at least one profiled rail and is moveable along this rail, and with a drivable conveyor means extending along the at least one profile rail, whereby the at least one transported goods support has at least one engagement unit, which is in locked-in engagement with the conveyor means or which can be brought into locked-in engagement with the conveyor means.

These types of transfer systems serve in a production line for transporting work pieces between individual stations, for example, at which machining or assembly processes take place. By way of example, reference is made to the catalogue "Transfersystem TS2" of Robert Bosch GmbH. In addition to the connection of manual working stations, these transfer systems are suited also for use with an automated assembly, based on their high positioning accuracy.

With this known system, the transported goods support lies loosely on two continuously circulating conveyor means, for example, belts or chains, which receive the work pieces (see catalogue, page 1-1). The work pieces are machined on the transported goods support. At the machining and assembly stations, the transported goods support is individually stopped or slowed, while the conveyor means runs further with unchanged speed. This has the result that between the transported goods support and the conveyor means, a relative movement occurs. Depending on which conveyor means is used and how heavy the transported goods support and work pieces are, on the basis of the friction between the conveyed goods support and the conveyor means, a more or less intense wear occurs on the transported goods support and conveyor means. The known system requires a high-powered drive, since this must serve not only for driving the transported goods support in the area of the conveyor section of the production line, but also for overcoming the static friction between the conveyor means and the transported goods support in the area of the machining and assembly stations coming from the weight of the work pieces and transported goods support.

The latter problem of the coupling of weight and driving force is resolved with the known conveying device of DE 198 25 955 A1. With this conveying device, the transported goods supports are longitudinally, movably supported via castors on a slide rail. With a first embodiment, the slide rail has a drive band guide, in which a friction band is guided. A frictional surface of the transported good support stands in force-locking, locked-in engagement with this friction band. With a holdup of the transported goods support, the friction-locked engagement of the transported goods support with the friction band is interrupted. Based on the relative movement between the friction band and the transported goods support, wear occurs on the contacted surfaces.

With a second embodiment of DE 198 25 955 A1, a driving change with finger-like engagement pieces is used, which engages the transported goods support form-lockingly. The engagement fingers are can be folded away, in order to make possible stopping of the transported goods support. In addition to the expense design of the driving chain with the foldable engagement pieces, wear and abrasion of the drive device still occurs also with this embodiment with stopping of the transported goods support, based on the impact of the engagement fingers against the transported goods support.

Finally, DE 198 25 955 A1 discloses a third embodiment, which represents a combination of the first two embodiments, and so, likewise, has the same disadvantages, in particular, the disadvantage of wear of the drive device which cannot be ignored.

For the sake of completeness, reference is made to DE 195 17 276 A1, DE 32 12 224 A1, and DE-PS 1 192 103 as further examples of the state of the art.

In conclusion, the primary disadvantage of the state of the art is that with a slowing or stopping of the transported goods support for enabling machining of the work pieces arranged thereon, wear and abrasion of the drive means, for example, the drive band, which is important for the ordinary functioning of the drive device, occurs.

In contrast, it is an object of the present invention to provide a conveying device of the above-described type, which displays a minimal, or negligible, wear of the conveyor means.

This object is solved according to the present invention, in which the engagement unit has an engagement element revolving about a bearing unit and in which, in addition, a coupling assembly, in particular, in inhibitive coupling assembly, is provided, which affects the revolving movement of the engagement element. In this manner, wear upon stopping or slowing of the transported goods support cannot occur on the functional surfaces of the transported goods support and conveyor means responsible for the locked-in engagement, rather on the coupling assembly specially provided for this purpose and indeed, then, when this includes a frictional assembly. This frictional assembly can be optimized in its function as a friction coupling, in particular by its construction and the selection of the material used. When the coupling assembly has a magnetic coupling, then the revolving movement of the engagement element can be affected also nearly wear-free.

In both embodiments, frictional coupling or magnetic coupling, an adjustment assembly can be provided, by means of which the amount of the affect of the revolving movement of the engagement element can be changed. In the case of the friction assembly, the adjustment assembly can affect the pressing force of the frictional assembly against the revolving engagement element. The adjustment arrangement can change the width of an air gap in the case of a magnetic coupling, which separates the two magnetically interactive magnetic coupling parts from one another. In addition, the adjustment assembly can serve for an integrated abrasion adjustment. In both embodiments, the adjustment arrangement can act on the coupling assembly for an effective use of the structural space available in an operating direction running substantially orthogonally to a revolving plane of the engagement element.

It is also contemplated that the revolving engagement element is formed as a revolving band or chain. Preferably, however, a wheel is used as the revolving engagement element, since its bearing is constructively simpler and its engagement with the conveyor means is more rigid and effective, based on its substantially rigid structure, compared with a band or chain. It is also advantageous if the engagement element and the conveyor means are in a positive-fit, locked-in engagement. Essentially, also a frictional engagement between the engagement means and the conveyor means is contemplated. This requires, however, a precise determination of the friction forces between the engagement element and the conveyor means on the one hand, as well as the engagement element and the coupling assembly on the other hand, in order to guarantee that upon stopping or slowing of the transported goods support, the required relative movement also occurs between the engagement element and the coupling assembly. Particularly preferred, then, is if the conveyor means is formed as a toothed belt and the engagement element is correspondingly formed as a cogwheel.

In order to ensure a regular engagement of the engagement element and the conveyor means, it is proposed that at least one profile rail has a guide section, which is guidingly engaged with the bearing element. Moreover, the guide section acts on the bearing element resiliently, in order to maintain the engagement between the bearing element and the conveyor means. Thus, the forces occurring between the conveyor means and the engagement element upon stopping or slowing of the transported goods support can be at least partially reduced by this resiliency. This favorably affects the abrasion of the engagement element and the conveyor means.

For a regular engagement of the engagement element and the conveyor means, it is also advantageous if at least one profile rail has a guide recess for guiding the conveyor means.

In a further form of the invention, it is provided that at least one profile rail has a sliding section, on which the at least one transported goods support lies. This gliding section can thereby include a separately formed sliding strip, which, for example, is held in a groove, preferably in a positive fit. Alternatively, however, it is also possible that the sliding section is a sliding shoulder formed as one-piece on the profile rail. In each case, the gliding strip or the gliding section can be made from a low-friction material, so that the frictional force to be overcome that comes from the force of weight upon conveying the transported goods support along the profile rail and from the drive device only has a minimal value.

The same advantage also can be achieved if at least one profile raise has a guideway for at least one linear slide associated with the transported good support, whereby, for example, a castor guide or a rotating ball guide or a ball castor assembly can be used.

For reducing the susceptibility to failure of the drive device, in a further embodiment of the invention, it is proposed that at least one profile rail has a resetting channel for the conveyor means. A resetting channel can be eliminated, if also the returning section of the conveyor means runs past stations or is used for driving of the transported goods support.

It can be advantageous, too, not only for the simple structure of this resetting channel, if at least one profile rail is formed as a multiple pieces with at least one support profile and at least one guide profile. In this connection, the support profile can be formed as a light metal profile, preferably, an aluminum profile, and the guide profile can be formed as a plastic profile. The two profiles, for example, can connect to one another by locking on of the plastic profile onto the light metal profile. The guide profile formed from plastic, therefore, can have the previously mentioned guide recesses for the conveyor means and the guide section for the bearing element. The resilient pressing of the bearing element against the conveyor means by means of the guide section can be accomplished, for example, by an inherent elasticity of the plastic material of the guide section. Basically, however, also the use of a one-piece profile rail is contemplated.

In order to enable slowing or acceleration of the movement of the transported goods support, it is proposed that the engagement element can be brought into engagement with an auxiliary engagement assembly at least along a part of the conveying track near the conveyor means. In this connection, the auxiliary engagement assembly can be formed fixedly in the simplest design, for example, as a gear rod. Such a fixed, auxiliary engagement assembly leads to a constant changing of the speed of the transported goods support for a time period predetermined by its extension in the movement direction of the transported goods support. Alternatively, the auxiliary engagement assembly also can be formed as a revolving or rotating engagement assembly, for example, as a toothed belt with a separate drive. With a revolving, auxiliary engagement assembly, the movement of the transported goods support can be accelerated and/or decelerated in any desired manner. Thus, also a reversal of the movement direction of the transported goods support is contemplated.

The conveying device of the present invention, then, also can be used as a table-type transported goods support, which lies on two profile rails, which is driven by means of a drive device, and whose conveyor means is merely provided on these profile rails. This is particularly advantageous because in this manner, a change of the width of the transported goods support need not cause a width change of the drive device. In addition, curve sections and branches from the confluence in the main track can be realized without expensive additional units, such as, for example, roller curves, lift-transverse units, and the like.

When each transported goods support has at least two engagement elements, then the discharging and feeding of a transported goods support from or into the main extension can be realized in a simple manner, in particular, without use of additional drives, since the drive device of the main track and secondary track can be arranged, such that at each point in time, always at least one of the engagement element is engaged with the conveyor means of the main track or the secondary track.

DETAILED DESCRIPTION OF THE PREFERRED EMBODIMENTS

Figure 1:
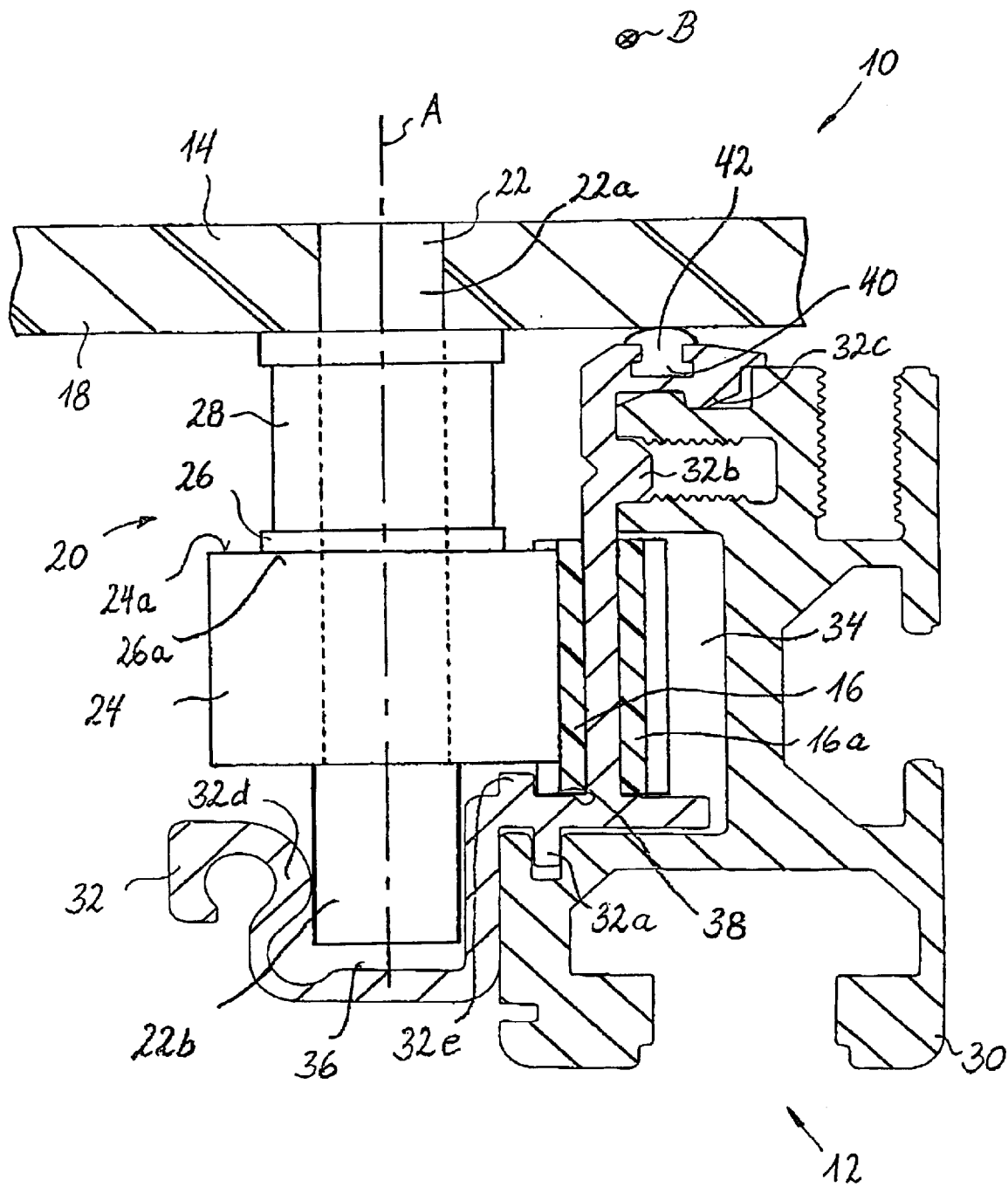
FIG. 1 shows a sectional view of a first embodiment of a conveying device of the present invention orthogonally to the movement direction of the transported goods support.

In FIG. 1, a conveying device of the present invention is designated generally with reference numeral 10. It includes a profile rail 12, which serves both for support and for guiding a transported goods support 14. In addition, a toothed belt 16 is guided on the profile rail 12 as a conveyor means of a drive device (not shown), which serves for driving the transported goods support 14 in the direction of movement B.

The transported goods support 14 is formed like a table in the present embodiment and includes a table plate 18, onto which the transported goods, for example, work pieces to be machined, can be attached or loosely arranged. In addition, the transported goods support 14 includes an engagement unit 20, which is formed to engage with the toothed belt 16. On an axis 22 (axis direction A), whose upper end 22a is attached to the plate 18, a gear wheel 24 is rotatably supported, whose outer toothing meshes with the toothing of the toothed belt. A frictional element 26 is tensioned by means of a spring assembly 28 working in an axial direction A against an upper front face 24 of the gear wheel 24 and is frictionally engagement with this element.

The tensioning force of the spring assembly 28 is selected, such that the frictional forces between the frictional element 26 and the gear wheel 24 are so great, that the transported goods support 24 is taken along by the toothed belt 16 based on the toothed engagement of the gear wheel 24 with the toothed belt 16 without rotation of the gear wheel 24 about the axis A. If the movement of the transported goods support 14, however, is interrupted or, compared with the movement of the toothed belt 16, is accelerated or decelerated, then the gear wheel 24 begins to roll away on the toothed belt 16 and rotates contrary to the frictional force between the frictional element 26 and the gear wheel 24 about the axis A. The gear wheel 24 and the frictional element 26 tensioned by the spring assembly 28 work together, then, as a friction coupling, which makes possible a de-coupling of the movement of the movement of the toothed belt 16 and the transported goods support 14. The gear wheel 24 rolls off with its outer toothing essentially abrasion-free on the toothing of the toothed belt 16. Abrasion or wear takes place in a practically insignificant amount exclusively between the gear wheel 24 and the frictional element 26.

It is to be understood that the front face 24a of the gear wheel 24 which is frictionally engaged with the frictional element 26 can either be formed as wear-resistant itself or can be provided with a rear-resistant friction coating. The wear occurs with the conveying device 10 of the present invention, then, on specially provided and formed elements.

It should be added that the frictional surfaces 26a of the frictional elements 26 and the front face 24a of the gear wheel 24 or its friction coating can be formed conically, with reference to the axis A. In this manner, a slight conicity serves for a self-centering of the frictional surfaces that are engagement with one another with reference to the axis A. With a marked conicity, in addition, the surfaces available for friction engagement can be enlarged.

In the embodiment shown in FIG. 1, the profile rail 12 is formed from two profiles, namely, a support profile 30 and a guide profile 32. The support profile 30 is preferably formed as a light metal profiled, for example, as an extruded aluminum sheath, and provides the necessary form stability of the profile rail 12. The guide profile 32 can be made out of plastic, for example. The guide profile 32 has shoulders 32a, 32b, and 32c, by means of which the guide profiled 32 is attached to the support profile 30 and locked with this. The two profiles 30 and 32 together form a resetting channel 34, in which the strand 16a of the toothed belt 16 that is not engaged with the gear wheels 24 of the transported goods supports 14 is returned.

In addition, the guide profile 32 is formed with a guide groove 36 having an essentially U-shaped form. In this guide groove 36, the lower end 22b of the bearing axis 22 for the gear wheel 24 is guided. Thus, the guide groove 26 represents the movement path of the transported goods support 14. The free leg 32d of the guide profile 32 is formed, such that it resiliently presses against the bearing axis 22, whereby the gear wheel 24 is held in toothed engagement with the toothed belt 16.

It should also be noted that a further shoulder 32e of the guide profile 32 forms a guide recess 38 for the toothed belt 16.

On its upper end in FIG. 1, the guide profile 32 has an undercut groove 40, in which a sliding strip 42 is inserted. The plate 18 of the transported goods support 14 lies on the sliding strip 42, preferably made of a low-friction and frictional-resistant material and slides along this strip 42.

Figure 2:
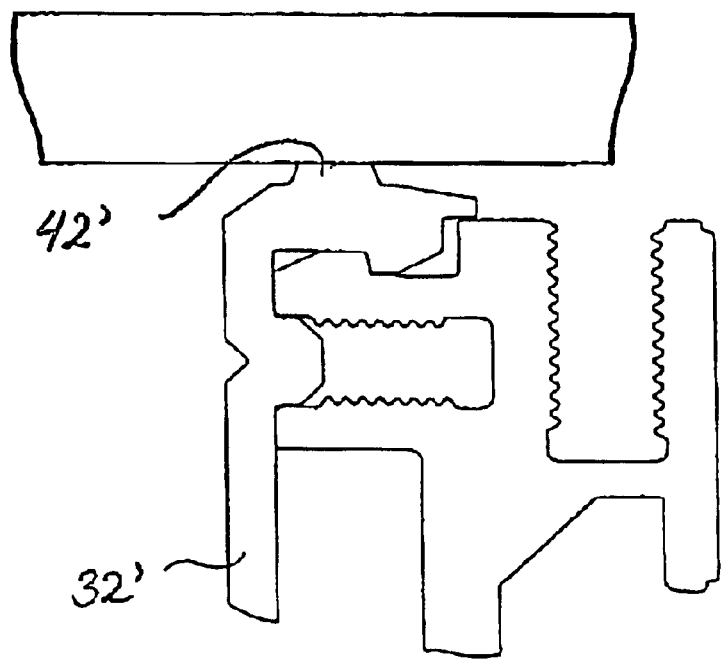
FIGS. 2 and 3 show views similar to FIG. 1 of further conveying devices according to the present invention.
Figure 3:
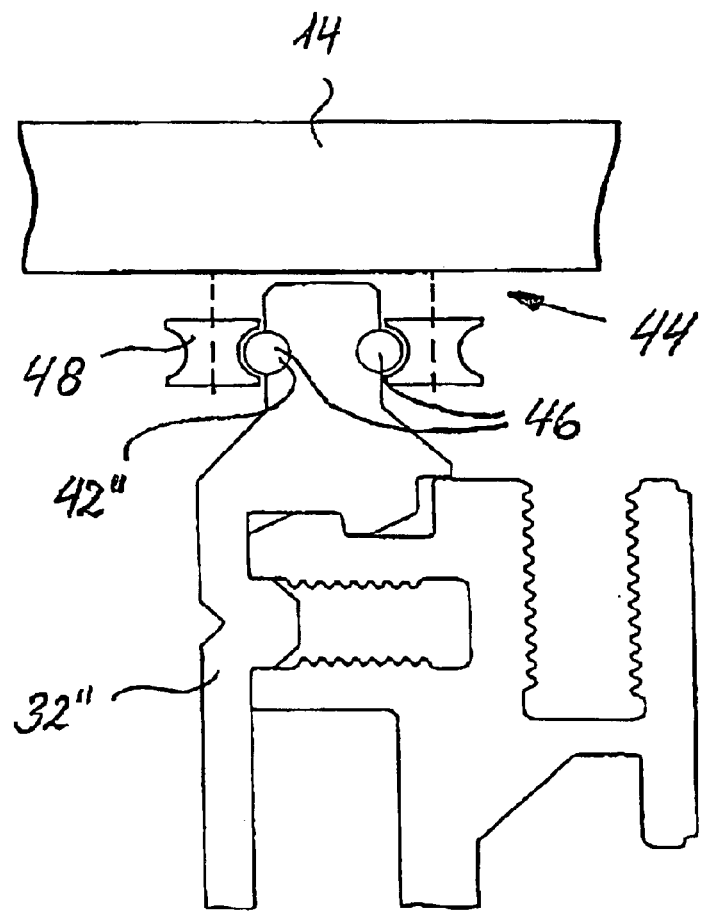

Instead of providing a separate sliding strip 42, also the guide profile 32' can be formed with a sliding shoulder 42', which is shown in FIG. 2. In addition, guideways can be formed or arranged on the guide profile 32" for a carriage 44 arranged on the transported goods support. In the embodiment shown in FIG. 3, these guideways 42" are formed from carrying wires 46, which are embedded in the guide profile 32". In addition, the carriage 44 includes rollers 48 in the embodiment shown.

An essential advantage of the conveying device 10 of the present invention is that in operation of the conveying device 10, when the transported good support moved along the profile rail 12, only the frictional force between the sliding strips 42 and the table plate 18 of the transported goods support must be overcome, while with an interruption of the movement of the transported good support 14, only the frictional force between the frictional element 26 and the gear wheel must be overcome. The (not shown) drive device for the toothed belt 16, therefore, can be correspondingly low-powered.

Figure 4:
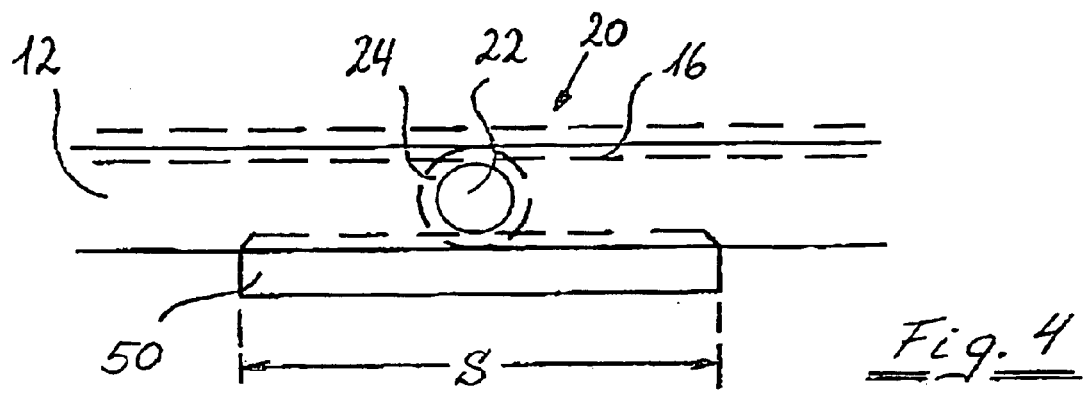
FIGS. 4 through 6 show schematic plan views of conveying devices of the present invention for clarification of embodiment variations.
Figure 5:
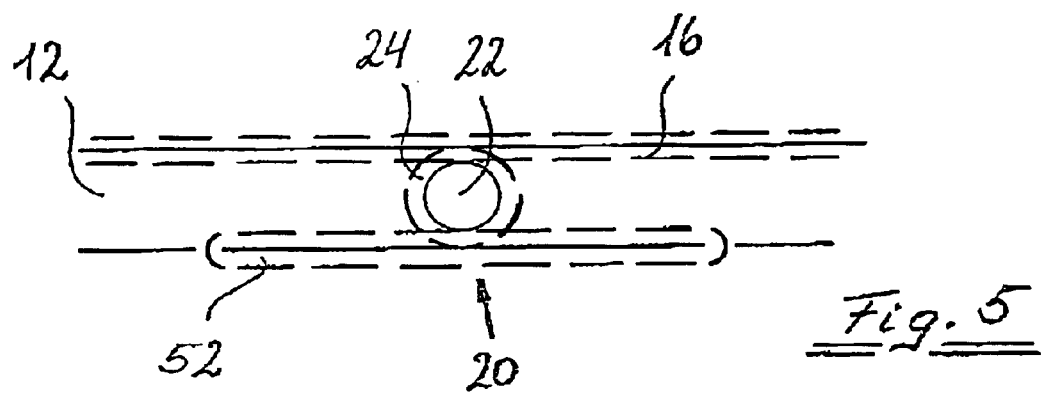
Figure 6:
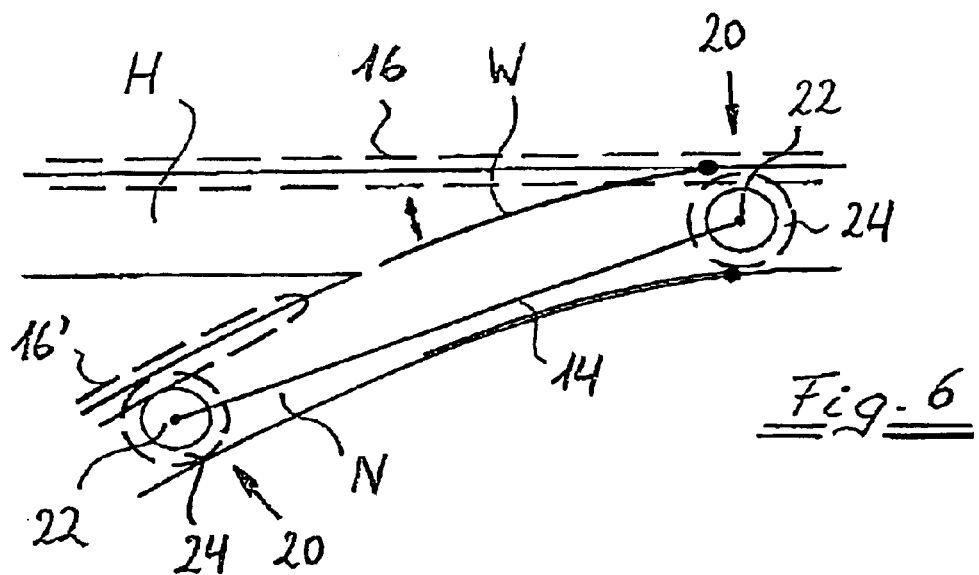

In order to enable a complete stopping of the transported goods support 14, known separate feeders can be used, which preferably acts directly on the table plate 18 of the transported goods support 14. With reference to FIGS. 4 and 5, two devices, however, can be used, with whose assistance, the speed of the movement of the transported goods support 14 can be purposefully affected.

With the embodiment shown in FIG. 4, the gear wheel 24 is engaged not only with the toothing of the toothed belt 16 along a track section S, but also with the toothing of a toothed rod 50. By means of this additional toothing engagement, the gear wheel 24 is displaced in a rotational movement about the axis A, so that it rolls off on the toothed belt 16 contrary to its direction of movement. As a result, the transported goods support 14 is slowed to the speed of the toothed belt 16.

In order to decelerate or accelerate the transported goods support 14, instead of the toothed rod 50, also a rotating or revolving toothed belt 42 can be used, whose direction of movement and movement speed can be purposeful predetermined. By use of a suitable position and/or speed sensor for the transported goods support 14, a control unit (not shown) can control the drive of the additional toothed belt 42, such that the desired direction of movement and movement speed of the transported goods support 14 is provided. Such a purposeful affecting of the movement of the transported goods support 14 has advantages, when, for example, the distance of successive transported goods support is to be adjusted to a predetermined amount or a transported goods support is to be moved to a machining station at a predetermined point in time.

It should be added that the table plate 18 of the transported goods support 14 can lie on at least one further profile rail. This further profile rail, however, need not be equipped with a toothed belt drive and therefore, can have a different structure than the profile rail 12.

One great advantage of equipping only one of these profile rails with a belt drive 16 is that the width of the conveying device 10 can be adapted in a simple manner to the respective application, without requiring a change of the drive device. In this connection, the "one-sided" drive concept makes possible in a simple manner the integration of a switch W for introducing transported good supports 14 into a main conveyor track H or for discharging of transported good supports 14 from a main conveyor track H into a secondary conveyor track N.

When one and the same transported goods support 14 is arranged on two engagement units 20, than it can be ensured in a simple manner that upon transition from the main conveyor track H onto the secondary conveyor track (or the reverse), with the use of a switch W, the gear wheel 24 of at least one of the engagement units 20 always is toothedly engaged with the toothed belt 16 of the main conveyor track H or the toothed belt 16' of the secondary conveyor track N. A speed adaptation between the main conveyor track H and the secondary conveyor track N occurs in a simple manner by using a frictional coupling between the friction elements 26 and the gear wheels 24. Thus, the expensive use of intermediate conveyor tracks for introduction and discharging and for speed adaptation can be eliminated.

Figure 7:
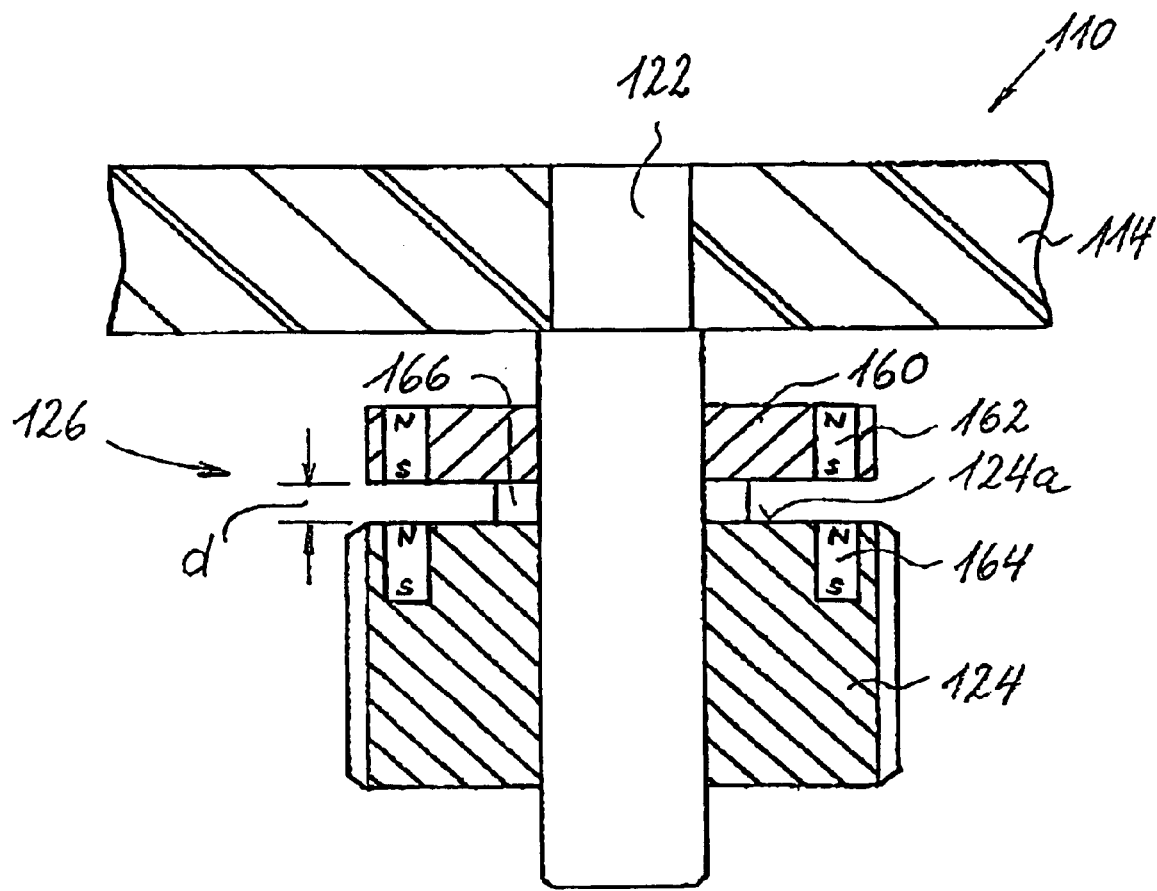
FIG. 7 shows a view similar to FIG. 1 of a further embodiment of a conveying device of the present invention.

In FIG. 7, a further embodiment of the conveying device of the present invention is shown, which essentially corresponds to the embodiment shown in FIG. 1. Analogous parts are designated with the same reference numerals in FIGS. 1 and 7, however, increased by 100. In addition, the embodiment according to FIG. 7 will be described only to the point that it differs from the embodiment shown in FIG. 1; reference is taken here to the description relating to FIG. 1.

The conveying device 110 provides a magnetic coupling device 126 instead of a coupling device formed as a frictional assembly.

On the bearing unit 122 fixed on the transported goods support 114, a fixed disk 160 is arranged, which contained permanent magnets 162. The permanent magnets 162 preferably are oriented in the same magnet direction, that is, for example, the south poles of all of the magnets 162 are directed downward in the representation of FIG. 7. Also, in the upper surface 124a of the engagement element 124 rotatably supported on the bearing unit 122, permanent magnets 164 are provided, which correspond in number, arrangement, and magnetic orientation of the permanent magnets 162. That is, in a coupling position of the coupling device 126, each permanent magnet 162 stands across from an associated permanent magnet 164, whereby two magnets associated with one another turn toward unlike poles, so that they oppositely attract. This attraction force prevents in known limits a full revolution of the engagement element 124.

The attraction force can be changed with predetermined mounting of the disk 160 and the engagement element 124 with magnets 162 and 164 by the distance d between the disk 160 and the engagement element 124. This distance can be affected by an adjustment device provided for this purpose. Alternatively, however, it is also possible, as shown in FIG. 7, to provide a distancing piece 166 of predetermined thickness d between the disk 160 and the engagement element 124.

It will be understood that each of the elements described above, or two or more together, may also find a useful application in other types of constructions differing from the types described above.

While the invention has been illustrated and described herein as a conveying device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A conveying device for transport of transported goods, comprising:

at least one profile rail;

at least one transported goods support, wherein said transported goods support is supported and moveable along the profile rail;

a drivable conveyor means extending along at least one profile rail, wherein the at least one transported goods support has at least one engagement unit, wherein said engagement unit is in locked-in engagement or can be brought into locked-in engagement with the conveyor means, wherein the engagement unit has an engagement element revolving about a bearing unit, and wherein a coupling assembly that affects a revolving movement of the engagement element is provided, wherein at least one profile rail has a guide section, wherein said guide section is guidingly engaged with the bearing unit, and wherein the guide section acts on the bearing unit resiliently and so the engagement element remains in engagement with the conveyor means.

2. The conveying device according to claim 1, wherein the coupling assembly includes a frictional assembly.

3. The conveying device according to claim 1, wherein the coupling assembly includes an abrasion-free coupling.

4. The conveying device according to claim 1, wherein an adjustment assembly is provided, wherein an amount of an affect of the revolving movement of the engagement element is changeable by means of said adjustment assembly.

5. The conveying device according to claim 4, wherein the adjustment assembly acts in an operating direction on the coupling assembly that runs substantially orthogonally to a revolution plane of the engagement element.

6. The conveying device according to claim 1, wherein at least one profile rail has at least one guide recess for guiding the conveyor means.

7. The conveying device according to claim 1, wherein at least one profile rail has a sliding section, wherein at least one transported goods support lies on the sliding section.

8. The conveying device according to claim 7, wherein the sliding section includes a separately formed sliding strip.

9. The conveying device according to claim 7, wherein the sliding section is a sliding shoulder formed as one-piece on the profile rail.

10. The conveying device according to claim 1, wherein at least one profile rail has a guideway for at least one linear slide associated with the transported goods support.

11. The conveying device according to claim 1, wherein at least one profile rail has a resetting channel for the conveyor means.

12. The conveying device according to claim 1, wherein at least one profile rail is formed in multiple pieces with at least one support profile and at least one guide profile.

13. The conveying device according to claim 12, wherein the support profile is formed as a light-metal profile, and the guide provide is formed as a plastic profile.

14. The conveying device according to claim 1, wherein the engagement unit has an engagement element supported on a transported goods support, wherein a locked-in engagement of the engagement element with the conveyor means can be terminated based on a resilient bearing.

15. The conveying device according to claim 3, wherein the abrasion-free coupling is a magnetic coupling.

16. The conveying device according to claim 12, wherein the support profile is formed as an aluminum profile.

17. A conveying device for transport of transported goods, comprising:
- at least one profile rail;
- at least one transported goods support, wherein said transported goods support is supported and moveable along the profile rail;
- a drivable conveyor means extending along at least one profile rail,
- wherein the at least one transported goods support has at least one engagement unit, wherein said engagement unit is in locked-in engagement or can be brought into locked-in engagement with the conveyor means, wherein the engagement unit has an engagement element revolving about a bearing unit, and wherein a coupling assembly that affects a revolving movement of the engagement element is provided, wherein the adjustment assembly includes a spring assembly.

18. A conveying device for transport of transported goods, comprising:
- at least one profile rail;
- at least one transported goods support, wherein said transported goods support is supported and moveable along the profile rail;
- a drivable conveyor means extending along at least one profile rail,
- wherein the at least one transported goods support has at least one engagement unit, wherein said engagement unit is in locked-in engagement or can be brought into locked-in engagement with the conveyor means, wherein the engagement unit has an engagement element revolving about a bearing unit, and wherein a coupling assembly that affects a revolving movement of the engagement element is provided, wherein the engagement element is a wheel.

19. A conveying device for transport of transported goods, comprising:
- at least one profile rail;
- at least one transported goods support, wherein said transported goods support is supported and moveable along the profile rail;
- a drivable conveyor means extending along at least one profile rail,
- wherein the at least one transported goods support has at least one engagement unit, wherein said engagement unit is in locked-in engagement or can be brought into locked-in engagement with the conveyor means, wherein the engagement unit has an engagement element revolving about a bearing unit, and wherein a coupling assembly that affects a revolving movement of the engagement element is provided, wherein the engagement element and the conveyor means are in positive-fit, locked-in engagement.

20. A conveying device for transport of transported goods, comprising:
- at least one profile rail;
- at least one transported goods support, wherein said transported goods support is supported and moveable along the profile rail;
- a driveable conveyor means extending along at least one profile rail,
- wherein the at least one transported goods support has at least one engagement unit, wherein said engagement unit is in locked-in engagement or can be brought into locked-in engagement with the conveyor means, wherein the engagement unit has an engagement element revolving about a bearing unit, and wherein a coupling assembly that affects a revolving movement of the engagement element is provided, wherein the guide profile can be locked onto the support profile.

21. A conveying device for transport of transported goods, comprising:
- at least one profile rail;
- at least one transported goods support, wherein said transported goods support is supported and moveable along the profile rail;
- a drivable conveyor means extending along at least one profile rail,
- wherein the at least one transported goods support has at least one engagement unit, wherein said engagement unit is in locked-in engagement or can be brought into locked-in engagement with the conveyor means, wherein the engagement unit has an engagement element revolving about a bearing unit, and wherein a coupling assembly that affects a revolving movement of the engagement element is provided, wherein the engagement element can be brought into engagement with an auxiliary engagement assembly at least along a part of a conveying track near the conveyor means.

22. The conveying device according to claim 21, wherein the auxiliary engagement assembly is formed to be stationary.

23. The conveying device according to claim 21, wherein the auxiliary engagement assembly is formed to be revolving.

24. A conveying device for transport of transported goods, comprising:
- at least one profile rail;
- at least one transported goods support, wherein said transported goods support is supported and moveable along the profile rail;
- a drivable conveyor means extending along at least one profile rail,
- wherein the at least one transported goods support has at least one engagement unit, wherein said engagement unit is in locked-in engagement or can be brought into locked-in engagement with the conveyor means, wherein the engagement unit has an engagement element revolving about a bearing unit, and wherein a coupling assembly that affects a revolving movement of the engagement element is provided, wherein each transported goods support has at least two engagement elements.

* * * * *